(12) United States Patent
Kosuge et al.

(10) Patent No.: US 10,186,217 B2
(45) Date of Patent: Jan. 22, 2019

(54) ALIGNMENT LAYERS OF LIQUID CRYSTAL DISPLAY DEVICE HAVING DIFFERENT TIME CONSTANTS

(71) Applicant: Japan Display Inc., Minato-ku (JP)

(72) Inventors: Masahiro Kosuge, Tokyo (JP); Yukio Tanaka, Tokyo (JP)

(73) Assignee: Japan Display Inc., Minato-ku (JP)

( * ) Notice: Subject to any disclaimer, the term of this patent is extended or adjusted under 35 U.S.C. 154(b) by 12 days.

(21) Appl. No.: 15/620,963

(22) Filed: Jun. 13, 2017

(65) Prior Publication Data

US 2017/0358264 A1 Dec. 14, 2017

(30) Foreign Application Priority Data

Jun. 14, 2016 (JP) .................. 2016-118071

(51) Int. Cl.

| | |
|---|---|
| G02F 1/1362 | (2006.01) |
| G02F 1/1337 | (2006.01) |
| G02F 1/1368 | (2006.01) |
| G02F 1/1343 | (2006.01) |
| G02F 7/00 | (2006.01) |
| G09G 3/36 | (2006.01) |
| G09G 5/42 | (2006.01) |
| G09G 3/34 | (2006.01) |

(52) U.S. Cl.
CPC ......... *G09G 3/3618* (2013.01); *G02F 1/1368* (2013.01); *G02F 1/13378* (2013.01); *G02F 1/133784* (2013.01); *G02F 1/134363* (2013.01); *G02F 1/136277* (2013.01); *G09G 3/3648* (2013.01); *G02F 2001/133773* (2013.01); *G02F 2001/133796* (2013.01); *G02F 2201/121* (2013.01); *G02F 2201/123* (2013.01); *G09G 3/3406* (2013.01); *G09G 3/3614* (2013.01); *G09G 3/3677* (2013.01); *G09G 3/3688* (2013.01); *G09G 2320/0247* (2013.01); *G09G 2330/021* (2013.01)

(58) Field of Classification Search
CPC combination set(s) only.
See application file for complete search history.

(56) References Cited

U.S. PATENT DOCUMENTS

| 9,601,071 B2 | 3/2017 | Suzuki et al. |
| 2002/0093473 A1 | 7/2002 | Tanaka et al. |

(Continued)

FOREIGN PATENT DOCUMENTS

| JP | 2002-278523 | 9/2002 |
| JP | 2015-75723 | 4/2015 |

*Primary Examiner* — Lauren Nguyen
(74) *Attorney, Agent, or Firm* — Oblon, McClelland, Maier & Neustadt, L.L.P.

(57) ABSTRACT

According to one embodiment, a display device includes a first substrate, a second substrate, a liquid crystal layer, a first alignment film, a pixel electrode, and a common electrode. The liquid crystal layer is disposed between the first substrate and the second substrate. The first alignment film is provided on the first substrate to be in contact with the liquid crystal layer. The pixel electrode is provided on the first substrate and covered with the first alignment film. The common electrode provided on the first substrate to form a lateral electric field. The liquid crystal layer is driven at a frequency of 40 Hz or less. A time constant of the liquid crystal layer is larger than a time constant of the first alignment film.

12 Claims, 10 Drawing Sheets

(56) References Cited

U.S. PATENT DOCUMENTS

2010/0309419 A1* 12/2010 Oka .................. C09K 19/0258
349/141
2015/0102988 A1* 4/2015 Suzuki ................ G09G 3/3648
345/92

* cited by examiner

| | Relative dielectric constant | Capacity ratio |
|---|---|---|
| Insulating layer (Cs) | 6.10 | 0.5000 |
| Insulating layer (C0) | 6.10 | 1.0000 |
| First alignment film (C1) | 4.00 | 1.1803 |
| Liquid crystal layer (C2) | 4.00 | 0.3000 |

| LTPS-TFT | | | | |
|---|---|---|---|---|
| 45°C condition | | First alignment film | | ○ Less than 1.3% |
| | Time constant | $4.0\times10^{10}$ | $4.0\times10^{11}$ | $4.0\times10^{12}$ |
| Liquid crystal layer | $2.0\times10^{10}$ | △ | × | × |
| | $2.0\times10^{11}$ | ○ | △ | × |
| | $2.0\times10^{12}$ | ○ | ○ | △ |

Note: Legend: ○ Less than 1.3%, △ 1.3~2.6%, × Over 2.6%

F I G. 11

| Oxide semiconductor TFT | | | | |
|---|---|---|---|---|
| 45°C condition | | First alignment film | | ○ Less than 1.3% |
| | Time constant | $4.0\times10^{10}$ | $4.0\times10^{11}$ | $4.0\times10^{12}$ |
| Liquid crystal layer | $2.0\times10^{10}$ | ○ | △ | × |
| | $2.0\times10^{11}$ | ○ | ○ | △ |
| | $2.0\times10^{12}$ | ○ | ○ | ○ |

Note: Legend: ○ Less than 1.3%, △ 1.3~2.6%, × Over 2.6%

F I G. 12

US 10,186,217 B2

ALIGNMENT LAYERS OF LIQUID CRYSTAL DISPLAY DEVICE HAVING DIFFERENT TIME CONSTANTS

CROSS-REFERENCE TO RELATED APPLICATIONS

This application is based upon and claims the benefit of priority from Japanese Patent Application No. 2016-118071, filed Jun. 14, 2016, the entire contents of which are incorporated herein by reference.

FIELD

Embodiments described herein relate generally to a display device.

BACKGROUND

Displays, in particular, displays mounted on mobile terminals are required to reduce power consumption. As means for reducing the power consumption of a drive circuit which drives liquid crystal, lowering a frequency for the circuit to update a video signal from a standard frequency of 60 Hz has been proposed (for example, JP 2002-278523 A). Since the circuit power consumption is proportional to the frequency, an effect of reducing the power consumption can be obtained.

However, if the frequency is lowered, a problem that flicker becomes conspicuous appears. If a time to recharge the video signal becomes long, a voltage of the liquid crystal cannot be held and the luminance of the liquid crystal is degraded due to an off-leak current of a thin-film transistor (TFT) of the drive circuit. This luminance degradation periodically occurs and results in flicker. To suppress occurrence of the flicker, the voltage of the liquid crystal needs to be held. The present invention therefore relates to a technology for suppressing voltage variation in the liquid crystal.

DETAILED DESCRIPTION

A display device to which low-frequency drive or the like is applied has various problems. The object of the present disclosure is to enhance the display quality of the display device by solving the problems.

In general, according to one embodiment, there is provided a display device comprising a first substrate, a second substrate, a liquid crystal layer, a first alignment film, a pixel electrode and a common electrode. The first substrate and the second substrate are opposed to each other. The liquid crystal layer is disposed between the first substrate and the second substrate. The first alignment film, the pixel electrode and the common electrode are provided on the first substrate. The first alignment film is in contact with the liquid crystal layer. The pixel electrode is covered with the first alignment film. A lateral electric field is formed between the pixel electrode and the common electrode. The display device is configured such that the liquid crystal layer is driven with a frequency of 40 Hz or less and a time constant of the liquid crystal layer is larger than a time constant of the first alignment film.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, and the like of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

Figure 1:
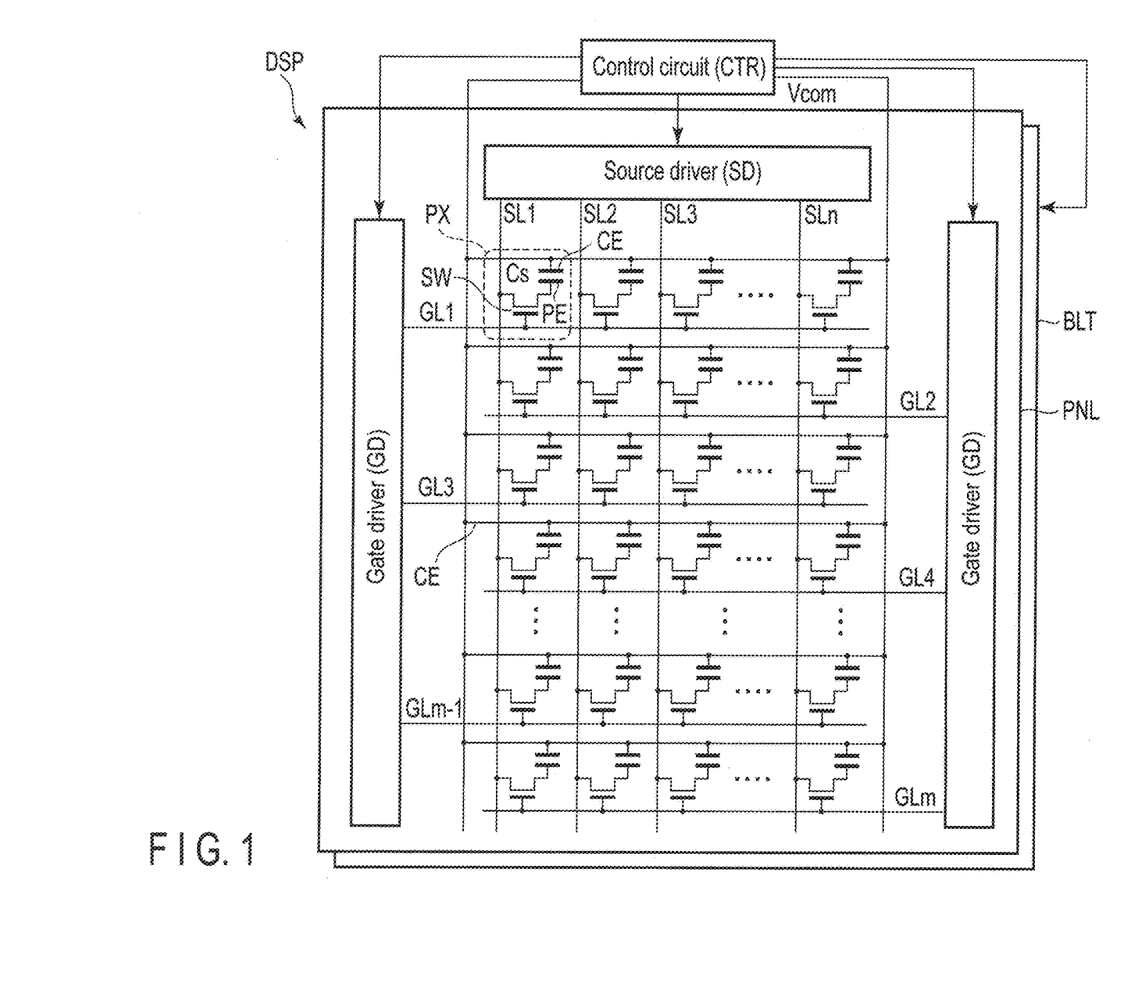
FIG. 1 is a plan view schematically showing a configuration of a liquid crystal display device.

FIG. 1 is a plan view schematically showing a configuration of a liquid crystal display device DSP of the embodiments. The liquid crystal display device DSP is mounted on, for example, various devices such as a smartphone, a tablet terminal, a mobile telephone terminal, a personal computer, a TV receiver, a vehicle-mounted device, a game console and a wearable terminal. The liquid crystal display device DSP has a function of operating with low-frequency drive of reducing the power consumption of a drive circuit under conditions that the reduction in power consumption is considered important.

The low-frequency drive is a drive scheme of lowering a frequency (refresh rate or frame frequency) of the liquid crystal display device DSP to a frequency lower than the standard (for example, 60 Hz). The low-frequency drive includes intermittent drive. The intermittent drive is a drive scheme of setting a circuit suspend period and lowering the frequency until the circuit performs rewrite after writing the video signal. A frequency of a video display device DSP is lower than or equal to 40 Hz, for example, 30 Hz or 15 Hz in the low-frequency drive (intermittent drive). In any of the drive schemes, the time elapsed until the video signal is rewritten (resupplied) becomes longer than that with the standard frequency.

The liquid crystal display device DSP comprises a liquid crystal panel PNL, and a backlight BLT which applies light to the liquid crystal panel PNL from its rear surface side. Pixels PX are arrayed in a matrix of m columns and n rows in the display area DA of the liquid crystal panel PNL. Each of the pixels PX on the liquid crystal panel PNL of the embodiments controls an alignment direction by a lateral electric field system such as In-plane Switching (IPS) or Fringe Field Switching (FFS) that is one of its manners. Since the liquid crystal panel PNL of the lateral electric field system has excellent voltage holding property as compared with that of the vertical electric field system, the liquid crystal panel is suitable for low-frequency drive.

The liquid crystal panel PNL comprises scanning lines GL (GL1, GL2, . . . GLm) extending in a row direction (for example, a horizontal direction) in which the pixels PX are aligned in the display area DA, signal lines SL (SL1, SL2, . . . SLn) extending in a columnar direction (for example, a vertical direction) in which the pixels PX are aligned, and switching elements (active elements) SW disposed near positions at which the scanning lines GL and the signal lines SL intersect.

The switching elements SW are, for example, thin-film transistors of silicon semiconductor TFT. The switching elements SW may be thin-film transistors of oxide semiconductor TFT. A gate electrode of the switching element SW is electrically connected with the corresponding scanning line GL. A source electrode of the switching element SW is electrically connected with the corresponding signal line SL.

The liquid crystal panel PNL comprises a gate driver (scanning-side drive circuit) GD and a source driver (signal-side drive circuit) SD to drive the pixels PX. The scanning lines GL are electrically connected with output terminals of the gate driver GD. The signal lines SL are electrically connected with output terminals of the source driver SD.

The gate driver GD and the source driver SD are disposed outside the display area DA. The gate driver GD sequentially applies an on-voltage to the scanning lines GL. The on-voltage is supplied to the gate electrode of the switching element SW electrically connected to the selected scanning line GL.

The switching element SW in which the on-voltage is supplied to the gate electrode becomes conductive between the source electrode and the drain electrode. The source driver SD supplies corresponding video signals to the respective signal lines SL. The video signals supplied to the signal lines SL are applied to the pixel electrodes PE via the switching elements SW which are conductive between the source electrodes and the drain electrodes.

Operations of the gate driver GD and the source driver SD are controlled by a control circuit CTR disposed outside the liquid crystal panel PNL. In addition, the control circuit CTR supplies a common voltage Vcom to a common electrode CE and controls the operation of the backlight BLT.

Furthermore, the control circuit CTR comprises functions of low-frequency drive and intermittent drive for reducing the drive power besides the general drive. In the general drive, the control circuit CTR controls the drive such that rewrite of the video signals to the pixels PX is executed at the frequency of 60 Hz, i.e., at every ($\frac{1}{60}$) sec. The general drive is executed when, for example, the liquid crystal display device DSP displays a moving image.

In contrast, in the intermittent drive, the control circuit CTR sets circuit suspend periods of, for example, ($\frac{1}{60}$) sec, ($\frac{3}{60}$) sec, ($\frac{7}{60}$) sec and ($\frac{59}{60}$) sec after executing the write of the video signals. The intermittent drive is executed when, for example, the liquid crystal display device DSP displays a still image. The operation of the control circuit CTR is stopped in the circuit suspend periods and the circuit power consumption becomes substantially zero during the periods. The circuit power consumption of the time average including the write time is thereby reduced to $\frac{1}{2}$, $\frac{1}{4}$, $\frac{1}{8}$ and $\frac{1}{60}$. In the drive schemes, however, the time from the write of the video signals to the pixels PX to the rewrite becomes long.

Figure 2:
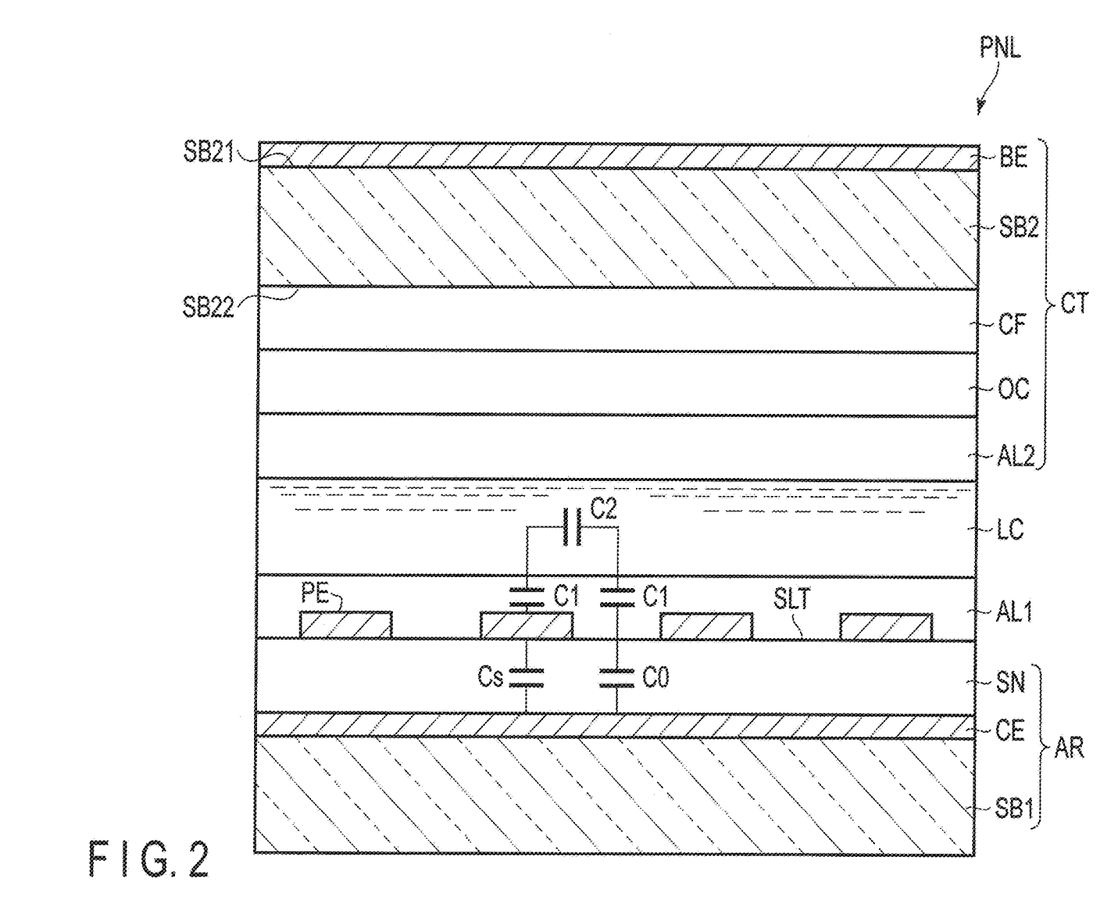
FIG. 2 is a cross-sectional view showing a liquid crystal panel shown in FIG. 1 in a thickness direction, expanding a pixel.

FIG. 2 is a cross-sectional view showing the liquid crystal panel PNL cut in the thickness direction, in the pixel PX. The liquid crystal panel PNL comprises an array substrate AR, a counter-substrate CT opposed to the array substrate AR, and a liquid crystal layer LC disposed between the array substrate AR and the counter-substrate CT. The liquid crystal layer LC contains liquid crystal molecules having a negative dielectric anisotropy. The liquid crystal layer LC may contain liquid crystal molecules having a positive dielectric anisotropy. The array substrate AR is an example of a first substrate and the counter-substrate CT is an example of a second substrate.

A first transparent substrate SB1, the common electrode CE, the pixel electrodes PE and a first alignment film AL1 are provided in the array substrate AR. The pixel electrodes PE are disposed on the common electrode CE via an insulating layer SN of silicon nitride (SiN) or the like. The pixel electrodes PE are disposed in accordance with the respective pixels PX. Slit-shaped opening portions SLT are formed between the adjacent pixels PX.

The pixel electrodes PE and the common electrode CE are formed of, for example, a transparent, electrically conductive material such as indium tin oxide (ITO) or indium zinc oxide (IZO). The first alignment film AL1 covers the pixel electrodes PE and is in contact with the liquid crystal layer LC. The first alignment film AL1 is, for example, an optical alignment film. The first alignment film AL1 may be a rubbing alignment film. If the first alignment film AL1 is a rubbing alignment film, dust generated in the rubbing treatment may flow from the first alignment film AL1 to the liquid crystal layer LC and change the resistivity of the liquid crystal layer LC. If the first alignment film AL1 is an optical alignment film, such dust is not generated.

A second transparent substrate SB2, a rear conductive film BE, a color filter CF, an overcoat OC and a second alignment film AL2 are provided in the counter-substrate CT. The second transparent substrate SB2 is formed of glass, resin or the like and has an optical transparency and an insulation property. The rear conductive film BE is formed of a transparent conductive material and covers a first surface SB21 of the second transparent substrate SB2. The color filter CF includes red (R), green (G) and blue (B) color layers disposed in accordance with the pixels PX, and is formed on a second surface SB22 of the second transparent substrate SB2.

The overcoat OC coats the color filter CF to prevent the substances contained in the color filter CF from flowing to the liquid crystal layer LC. The second alignment film AL2 further covers the overcoat OC and is in contact with the liquid crystal layer LC. The second alignment film AL2 is, for example, a rubbing alignment film. The second alignment film AL2 may be, for example, an optical alignment film. If the second alignment film AL2 is a rubbing alignment film, a resistivity of the second alignment film AL2 can easily be adjusted since the materials of the rubbing alignment film can be selected more widely than those of the optical alignment film.

Incidentally, when write of the video signals is executed, capacity components Cs of the insulating layer SN are generated at portions at which the pixel electrodes PE and the common electrode CE are opposed while sandwiching the insulating layer SN. Furthermore, a capacity component C2 of the liquid crystal layer LC, a capacity component C1 of the first alignment film AL1, and a capacity component C0 of the insulating layer SN are generated in accordance with the electric field diffracting the interior of the liquid crystal layer LC. A sum of the capacity components C0, C1 and C2 is equal to the capacity component Cs. The capacity component Cs can be represented as an equivalent circuit (shown in FIG. 1) which sandwiches the capacity component Cs between the common electrode CE and the drain electrode of the switching element SW.

Alignment of the liquid crystal molecules of the liquid crystal layer LC is varied by the electric field generated between the pixel electrodes PE and the common electrode CE. The liquid crystal panel PNL is composed in a normally black mode and allows the transmission amount of the light applied from the backlight BLT to be increased in accordance with the voltage applied to the pixel electrodes PE. For example, if the applied voltage is increased by 1%, the transmission amount of the light of the liquid crystal panel PNL is increased by 4%. The liquid crystal panel PNL may be composed in a normally white mode of reducing the transmission amount of the light in accordance with the applied voltage. The video is displayed on the display area DA (shown in FIG. 1) by controlling the voltage applied to the pixel electrodes PE.

Since the display property is varied when a DC voltage is applied to the liquid crystal materials contained in the liquid crystal layer LC for a long time, a voltage having positive and negative polarities inverted in every frame is applied to the liquid crystal materials. For example, column-inversion, line-inversion and dot-inversion drive schemes can be employed as the drive scheme of inverting the positive and negative polarities.

Figure 3:
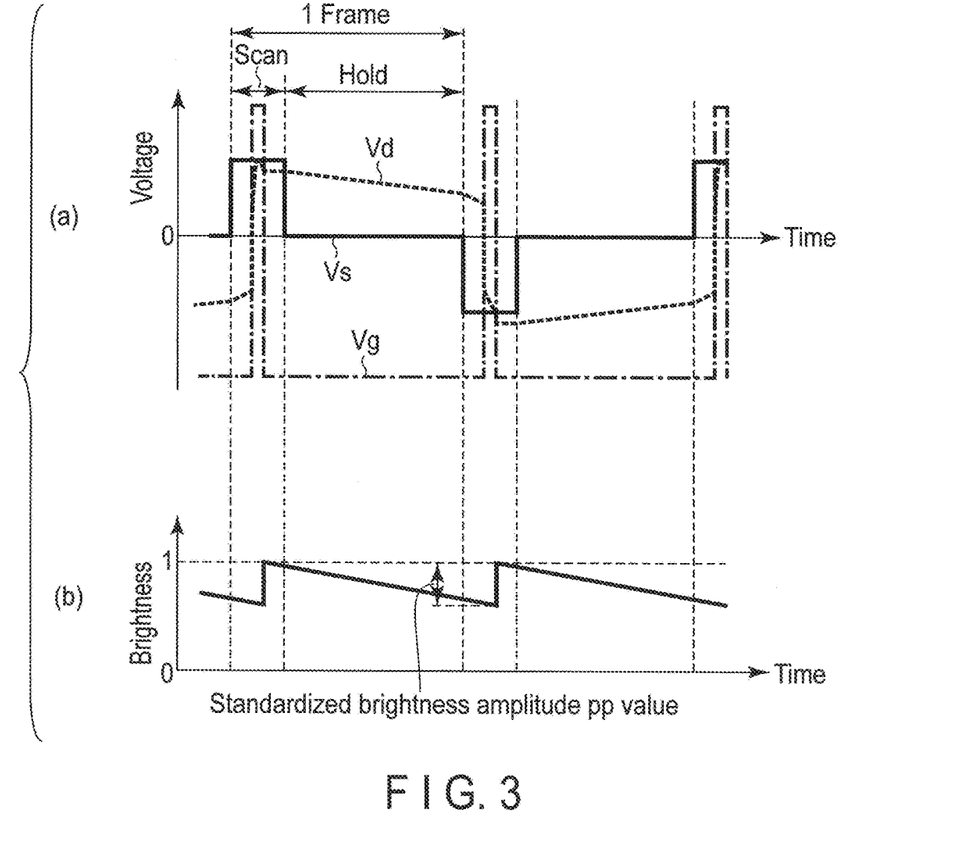
FIG. 3 is a graph showing an example of luminance variation in the liquid crystal display device shown in FIG. 1.

FIG. 3 is a graph showing an example of luminance variation in the liquid crystal display device DSP of the embodiments. FIG. 3(a) shows progression of a pixel voltage Vd, a signal line voltage Vs and a gate voltage Vg while FIG. 3(b) shows progression of the luminance in the liquid crystal display device DSP.

The source driver SD outputs the signal line voltage Vs corresponding to the video signal to the signal line SL, in a one-frame scanning period. Next, the gate driver GD outputs the gate voltage Vg to turn on the switching element SW to the scanning line GL. As a result, the signal line voltage Vs is supplied to the pixel voltage PE, and the pixel voltage Vd becomes equal to the signal line voltage Vs. The luminance of the pixel PX is thereby adjusted in accordance with the video signal.

In a one-frame holding period, the gate voltage Vg becomes a level to turn off the switching element SW, and the pixel voltage Vd is held at the signal line voltage Vs. If the holding period is long, however, the pixel voltage Vd is gradually lowered due to the off-leak current of the switch element SW. The off-leak current is, for example, a current leaking from the drain to the source in the thin-film transistor.

The silicon semiconductor TFT such as a low-temperature polysilicon semiconductor (LIPS) generally used for the liquid crystal display is excellent in electron drift velocity as compared with the oxide semiconductor TFT while the off-leak current of the silicon semiconductor is large. LTPS-TFT has the electron drift velocity of, for example, 100 $cm^2/Vs$ or more and the off-leak current of, for example, $10^{-12}$ A or less. The oxide semiconductor TFT has the electron drift velocity of, for example, 10 $cm^2/Vs$ or more and the off-leak current of, for example, $10^{-16}$ A or less.

If a next frame is started and the pixel voltage Vd is rewritten by a new signal line voltage Vs, the luminance of the pixel PX is returned. The polarity of the pixel voltage Vd is varied in the frames for the reason that the above-explained frame-inversion drive scheme is executed. Since the luminance variation caused by the off-leak current is repeated in every frame, flicker is visually recognized. The luminance in FIG. 3(b) is standardized such that its target value becomes 1. The amount of the standardized luminance lowering by the off-leak current is regarded as a standardized luminance amplitude pp value.

Figure 4:
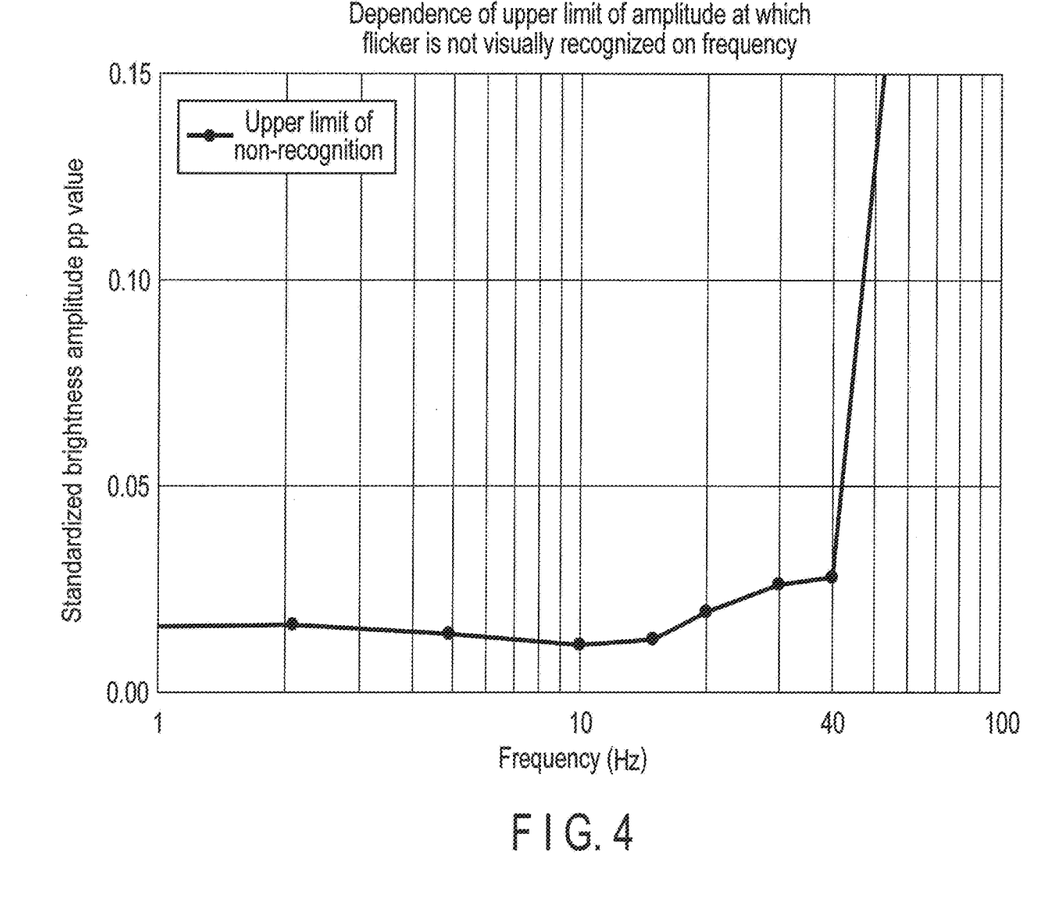
FIG. 4 is a graph showing a relationship between a frequency and an upper limit of a standardized luminance amplitude pp value in which flicker is not visually recognized.

It is generally known that the flicker visibility on human vision depends on a frequency. The luminance variation of the same amplitude can easily be visually recognized as the flicker as the frequency becomes lower. FIG. 4 is a graph showing a relationship between a frequency and an upper limit of a standardized luminance amplitude pp value in which flicker is not visually recognized as obtained based on subjective evaluation.

As shown in FIG. 4, the line rapidly rises up when the frequency exceeds 40 Hz. This indicates that if the frequency is higher than 40 Hz the luminance amplitude can hardly be recognized visually as flicker even if it is great, and if the frequency is lower than or equal to 40 Hz the luminance amplitude can easily be recognized visually as flicker even if it is small.

Figure 5A:
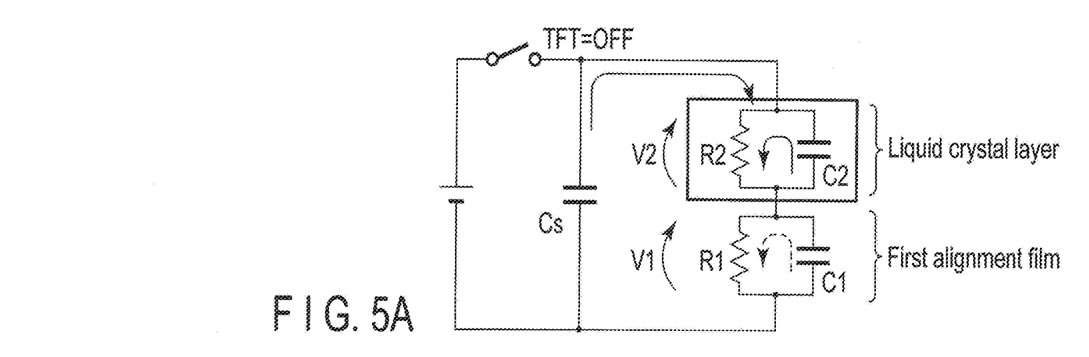
FIGS. 5A and 5B are an illustration for explanation of variation in voltage of a liquid crystal layer resulting from a relationship in magnitude of a time constant between the liquid crystal layer and a first alignment film.
Figure 5B:
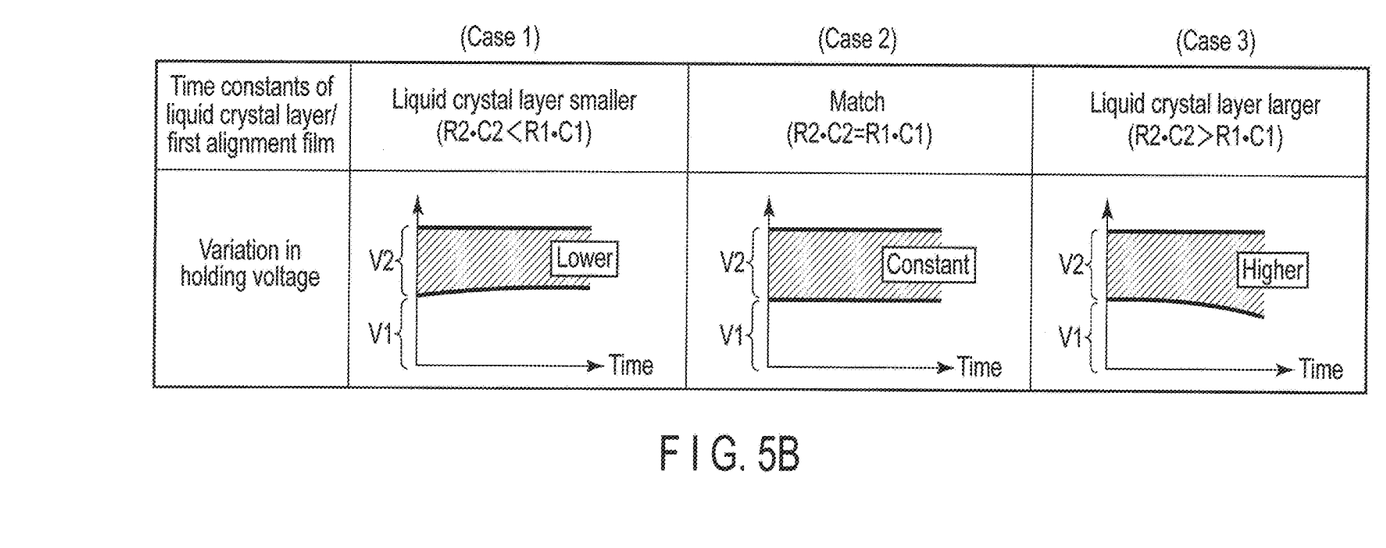

FIGS. 5A and 5B are an illustration for explanation of variation in voltage V2 of the liquid crystal layer LC resulting from a relationship in magnitude of a time constant between the liquid crystal layer LC and the first alignment film AL1. An equivalent circuit model of the liquid crystal panel PNL shown in FIG. 5A is composed of a storage capacitor Cs formed at a portion at which the pixel electrode PE and the common electrode CE are opposed, a storage capacitor C2 of the liquid crystal layer LC generated in accordance with the electric field diffracting the interior of the liquid crystal layer LC, and a storage capacitor C1 of the first alignment film AL1. Resistors R1 and R2 are provided parallel in the storage capacitors C1 and C2, respectively. The storage capacitors Cs, C1 and C2 correspond to the capacity components Cs, C1 and C2 shown in FIG. 2, respectively.

If the switching element SW is turned off and becomes in a pixel voltage holding state, each of the liquid crystal layer LC and the first alignment film AL1 discharges independently but supplied with electric charges from the storage capacitor Cs to compensate for the reduction of the electric charges caused by the discharging. However, if the one-frame holding period becomes long, supply of the electric charges from the storage capacitor Cs cannot compensate for the reduction of the electric charges caused by the discharging, and V1 and V2 become gradually lowered.

Case 1 shown in FIG. 5B represents variation of voltage V2 of the liquid crystal layer LC in a case where the time constant (R2·C2) of the liquid crystal layer LC is smaller than the time constant (R1·C1) of the first alignment film AL1. In Case 1, the reduction in the electric charges caused by discharging is larger in the liquid crystal layer LC. In contrast, supply of the electric charges from the storage capacitor Cs is equivalently distributed to the liquid crystal layer LC and the first alignment film AL1. As a result, a voltage ratio (V2/V1) of the liquid crystal layer LC and the first alignment film AL1 becomes smaller as the time elapses.

Case 2 shown in FIG. 5B represents variation of voltage V2 of the liquid crystal layer LC in a case where the time constant (R2·C2) of the liquid crystal layer LC is approximately matched with the time constant (R1·C1) of the first alignment film AL1. In Case 2, the electric charges lost from the liquid crystal layer LC by the discharging is approximately equivalent to the electric charges lost from the liquid crystal layer LC by the discharging. In addition, supply of the electric charges from the storage capacitor Cs is equivalently distributed to the liquid crystal layer LC and the first alignment film AL1. As a result, the voltage ratio (V2/V1) of the liquid crystal layer LC and the first alignment film AL1 is maintained constantly.

Case 3 shown in FIG. 5B represents variation of voltage V2 of the liquid crystal layer LC in a case where the time constant (R2·C2) of the liquid crystal layer LC is larger than the time constant (R1·C1) of the first alignment film AL1. In Case 3, the reduction in the electric charges caused by discharging is larger in the first alignment film AL1. In contrast, supply of the electric charges from the storage capacitor Cs is equivalently distributed to the liquid crystal layer LC and the first alignment film AL1. As a result, the voltage ratio (V2/V1) of the liquid crystal layer LC and the first alignment film AL1 becomes larger as the time elapses. The off-leak current from the transistor connected to the pixel electrode is not considered in three cases described above.

Figure 6:
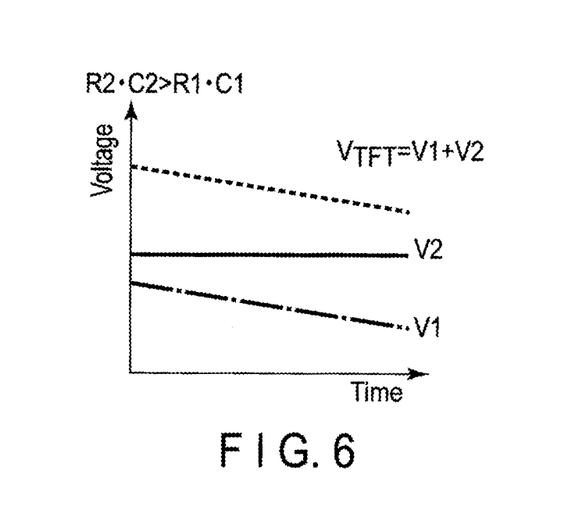
FIG. 6 is a graph for explanation of variation in voltage of the liquid crystal layer under conditions that the time constant of the liquid crystal layer is larger than that of the first alignment film.

FIG. 6 is a graph for explanation of variation in the voltage V2 of the liquid crystal layer LC in Case 3 shown in FIG. 5B. As shown in FIG. 6, if the switching element SW is turned off and becomes in a pixel voltage holding state, a sum (V1+V2) of the voltages of the liquid crystal layer LC and the first alignment film AL1 becomes gradually lower. However, if the time constant (R2·C2) of the liquid crystal layer LC is larger than the time constant (R1·C1) of the first alignment film AL1, the electric charges discharged from the first alignment film AL1 flow to the liquid crystal layer LC and the reduction in the voltage V2 of the liquid crystal layer LC can be thereby suppressed.

Figure 7:
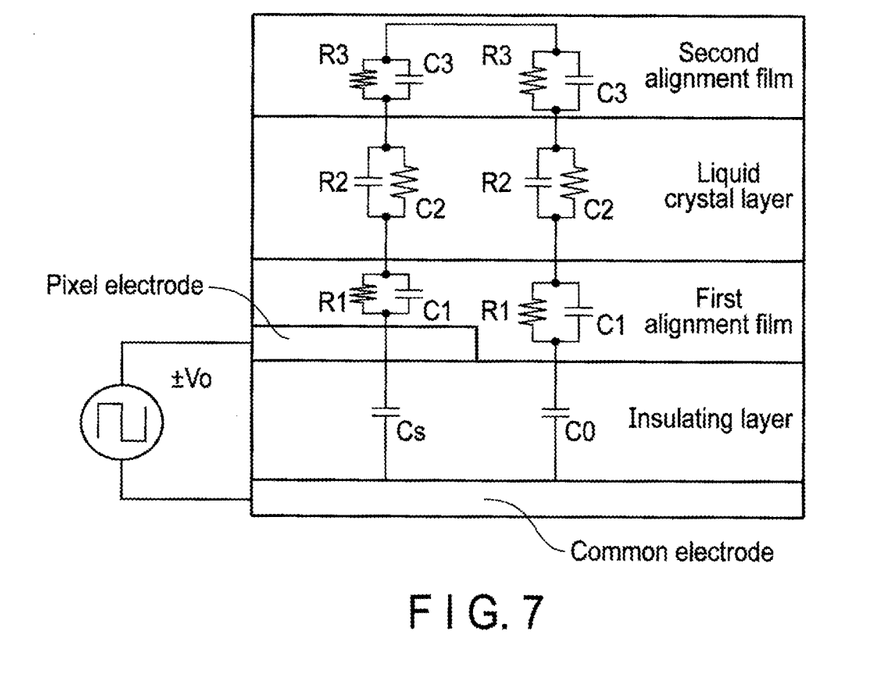
FIG. 7 is a diagram showing a capacity component of a second alignment film generated in response to an electric field diffracting the interior of the second alignment film.

Incidentally, the electric charges of the liquid crystal layer LC may be excessive as a result that the electric charges flow from the first alignment film AL1 to the liquid crystal layer LC. FIG. 7 is a diagram showing a circuit model considering the electric field diffracting the interior of the second alignment film AL2 besides the liquid crystal layer LC and the first alignment film LA1 shown in FIG. 5A. In FIG. 7, if a time constant (R3·C3) of a second alignment film AL2 is set to be larger than the time constant (R2·C2) of the liquid crystal layer LC, the electric charges discharged from the liquid crystal layer LC can be allowed to escape to the second alignment film AL2. Even if the second alignment film AL2 is charged, the second alignment film AL2 can allow the electric charges to escape to the rear conductive film BE formed on the second transparent substrate SB2.

Figure 8A:
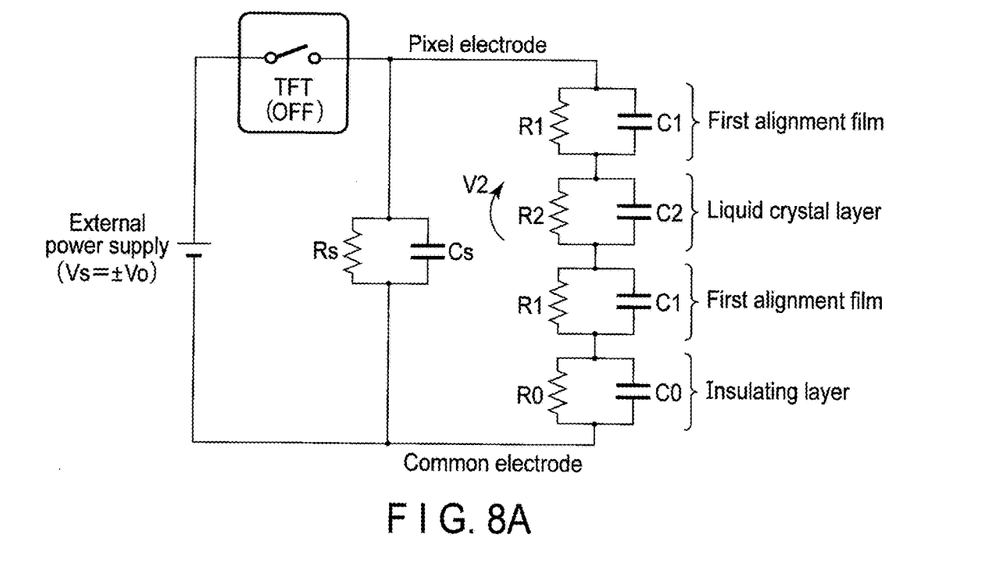
FIGS. 8A and 8B are a diagram showing calculation conditions and a circuit model applied to simulation.
Figure 8B:
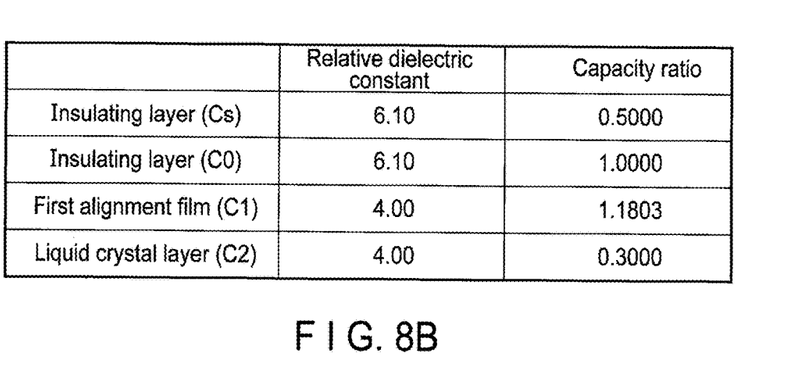
Figure 9A:
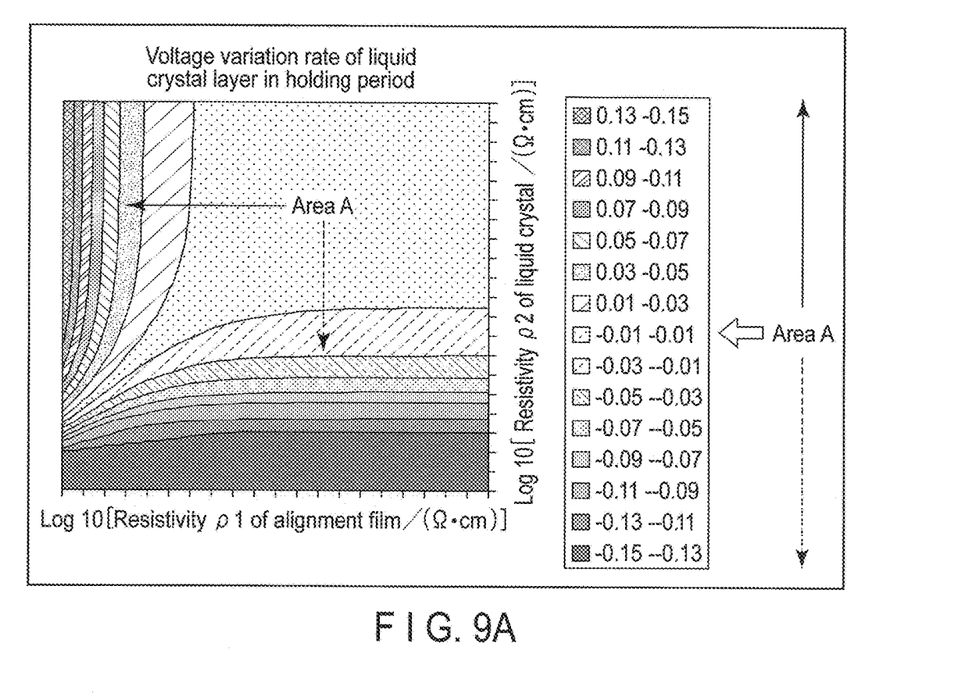
FIGS. 9A and 9B are an illustration showing results of simulation of a voltage in the liquid crystal layer varied in a holding period.
Figure 9B:
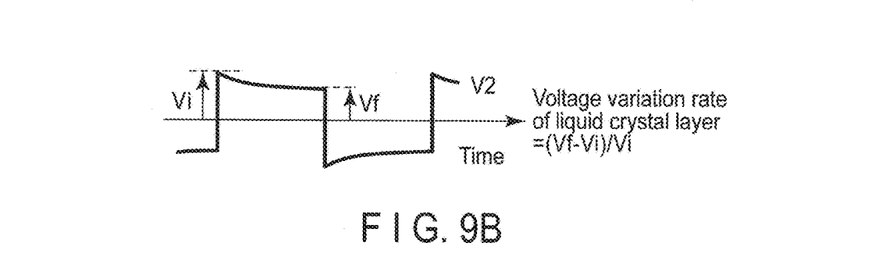

FIGS. 8A and 8B are a diagram showing calculation conditions and a circuit model applied to simulation. FIG. 8A shows a circuit model and FIG. 8B shows calculation conditions. FIG. 9A is an illustration showing results of a voltage variation rate of the liquid crystal layer LC in the one-frame holding period simulated under the conditions shown in FIGS. 8A and 8B. In FIG. 9A, a lateral axis represents a resistivity (resistivity) $\rho 1$ of the first alignment film AL1 and a longitudinal axis represents a resistivity $\rho 2$ of the liquid crystal layer LC. The voltage variation rate represents a rate of the voltage V2 of the liquid crystal layer LC lowered or increased in the one-frame holding period and is calculated by (Vf−Vi)/Vi in FIG. 9B.

It should be noted that time constant $\tau$ is equal to resistance R×capacity C and also equal to dielectric constant $\varepsilon$×resistivity $\rho$. In the liquid crystal display device DSP of the embodiments, the dielectric constant $\varepsilon$ is approximately 4 in any one of the liquid crystal layer LC, the first alignment film AL1 and the second alignment film AL2 and is not different significantly. For this reason, the relationship in magnitude between the time constants (R·C) can be made approximate to the relationship in magnitude between the resistivities $\rho$. For example, if the resistivity $\rho 2$ of the liquid crystal layer LC is larger than the resistivity $\rho 1$ of the first alignment film AL1, the time constant (R2·C2) of the liquid crystal layer LC can be made approximate to the time constant (R1·C1) of the first alignment film AL1.

Area A at an upper right part of FIG. 9A is an area where the voltage variation rate of the liquid crystal layer LC is the smallest. As the resistivity $\rho 1$ of the first alignment film AL1 becomes smaller, the voltage variation rate of the liquid crystal layer LC rises to the positive side (plus side) as represented by an arrow of a solid line. As the resistivity $\rho 2$ of the liquid crystal layer LC becomes smaller, the voltage variation rate of the liquid crystal layer LC falls to the negative side (minus side) as represented by an arrow of a broken line.

Figure 10:
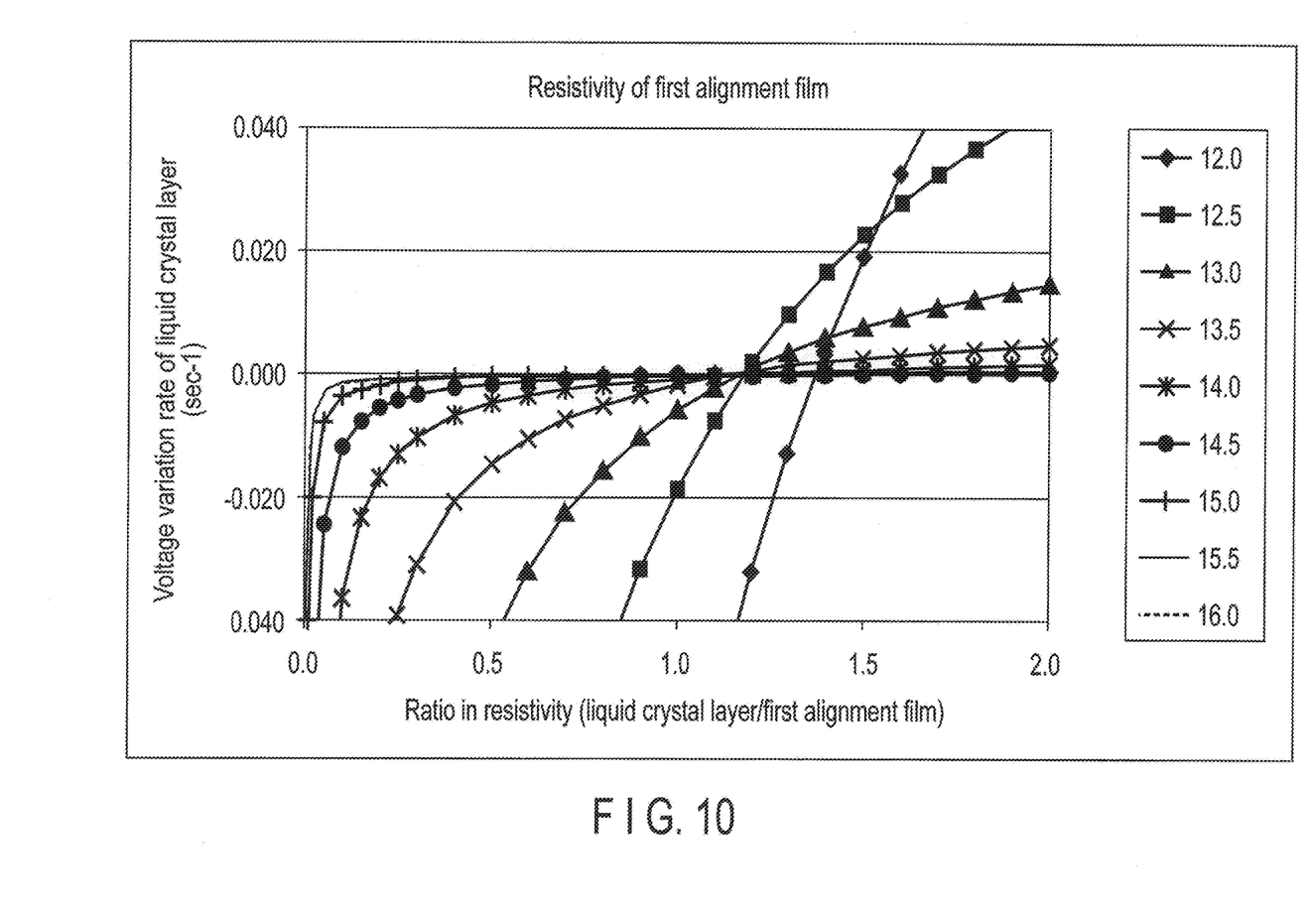
FIG. 10 is a graph showing a correlation between a variation in the voltage of the liquid crystal layer and a ratio in resistivity of the liquid crystal layer to the first alignment film.

FIG. 10 is a graph showing a correlation between the voltage variation rate of the liquid crystal layer LC and a ratio in resistivity of the liquid crystal layer LC to the first alignment film AL1 (resistivity $\rho 2$ of the liquid crystal layer/resistivity $\rho 1$ of the first alignment film), which plots the simulation results shown in FIG. 9A for each resistivity $\rho 1$ of the first alignment film AL1. As shown in FIG. 10, any plots rise up to the upper right side. It can be understood from the simulation results that if the (resistivity $\rho 1$ of the first alignment film AL1 is smaller and the resistivity $\rho 2$ of the liquid crystal layer LC is larger, without influence from the off-leak current, the voltage variation rate of the liquid crystal layer LC can be increased to the upward side.

The voltage variation rate of the liquid crystal layer LC on the upward side indicates that electric charges flow from the first alignment film AL1 to the liquid crystal layer LC. For this reason, the electric charges flowing from the first alignment film AL1 can compensate for reduction in electric charges of the liquid crystal layer LC resulting from the reduction in the storage capacitor Cs, and reduction in the voltage V2 of the liquid crystal layer LC can be suppressed.

However, if the resistivity $\rho 1$ of the first alignment film AL1 is so large, supply and reception of the electric charges are hardly executed as shown in FIG. 10. The time constant (R1·C1) of the first alignment film AL1 is desirably $2.0 \times 10^{13}$ sec or less and the time constant (R2·C2) of the liquid crystal layer LC is desirably $8.0 \times 10^{13}$ sec or less from the viewpoint of the supply and reception of the electric charges. The resistivity $\rho 1$ of the first alignment film AL1 is desirably $5.0 \times 10^{15}$ Ω·cm or less.

In contrast, if the resistivity $\rho 1$ of the first alignment film AL1 is so small, the liquid crystal display device DSP becomes electrically sensitive and can easily be influenced by disturbance such as temperature variation. To make the performance of the liquid crystal display device DSP stable, the time constant of the first alignment film AL1 is desirable $1.0 \times 10^{10}$ sec or more. The resistivity $\rho 1$ is desirably $1.0 \times 10^{11}$ $\Omega \cdot cm$ or more.

Figure 11:
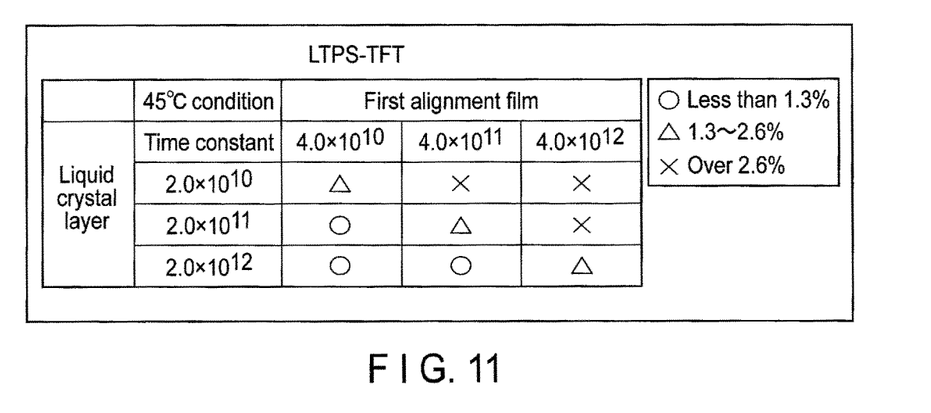
FIG. 11 is a table showing a result of evaluation of a flicker rate in a LTPS-TFT test cell.
Figure 12:
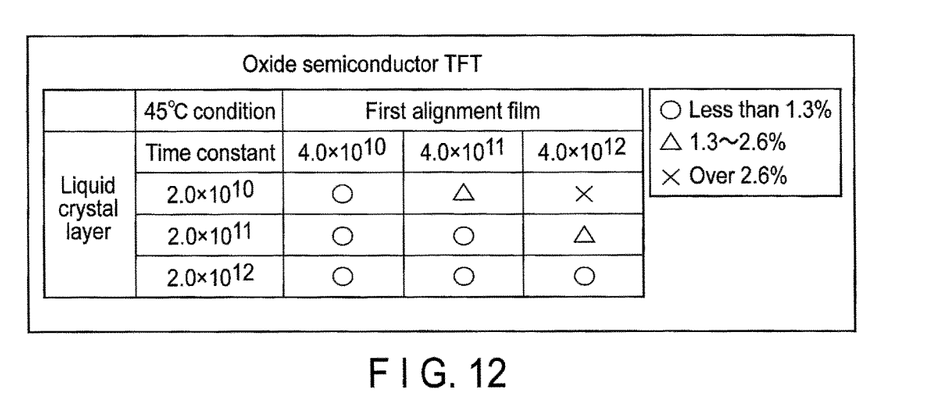
FIG. 12 is a table showing a result of evaluation of a flicker rate in an oxide TFT test cell.

Next, the above-explained flicker reduction effect was confirmed in experiments using test cells comprising various combinations of the liquid crystal layer LC and the first alignment film AL1. Video signals of 30 Hz having the voltage inverted in each frame were applied to the test cells in static drive in which all the switching elements SW were turned on. The applied voltage was set to be close to a voltage value at which the light transmittance can be varied most easily and the light applied from the backlight BLT was 100 cd. The flicker rate (Emax−Emin)/Eave was calculated where the maximum luminance was Emax, the minimum luminance was Emin and the average luminance was Save. The results on the test cells of LTPS-TFT in the switching element SW are shown in FIG. 11. The results on the test cells of oxide semiconductor TFT in the switching element SW are shown in FIG. 12.

As shown in FIG. 11, the flicker rate was smaller than 1.3% when the time constant (R2·C2) of the liquid crystal layer LC was larger than the time constant (R1·C1) of the first alignment film AL1, but the flicker rate rose to 1.3 to 2.6% when the time constant (R2·C2) of the liquid crystal layer LC became slightly smaller than the time constant (R1·C1) of the first alignment film AL1. Furthermore, the flicker rate rose over 2.6% when the time constant (R2·C2) of the liquid crystal layer LC was smaller than the time constant (R1·C1) of the first alignment film AL1 by one digit or more. As shown in FIG. 12, in the oxide semiconductor TFT in which the off-leak current was small, too, the same tendency as that of LTPS-TFT was confirmed in the relationship in magnitude between the time constants and the flicker reduction effect.

According to the liquid crystal display device DSP of the embodiments configured as described above, the electric charges are supplied for compensation from the first alignment film AL1 in contact with the liquid crystal layer LC to the liquid crystal layer LC since the time constant (R2·C2) of the liquid crystal layer LC is larger than the time constant (R1·C1) of the first alignment film AL1, even if the storage capacitor Cs is reduced in a holding period from the time when the video signal is written to the time when the video signal is rewritten. Thus, the performance of the liquid crystal in the lateral electric field scheme excellent in the voltage holding property can be further improved, and the reduction in the voltage V2 of the liquid crystal layer LC can be suppressed even if the time to re-input the video signal is extended. According to the embodiments, the power consumption can be saved without sacrificing the display quality since the flicker can be suppressed even at the low-frequency drive of 40 Hz or lower.

If the time constant (R1·C1) is so large, the electric charges of the liquid crystal layer LC cannot be supplied for compensation since the electric charges are hardly exchanged between the first alignment film AL1 and the liquid crystal layer LC. In contrast, if the time constant (R1·C1) is so small, the liquid crystal display device DSP cannot exert stable performance since the liquid crystal panel PNL becomes electrically sensitive. In the embodiments, the time constant (R1·C1) of the first alignment film AL1 is adjusted at $1.0 \times 10^{10}$ sec or more and $2.0 \times 10^{13}$ sec or less, and the time constant (R2·C2) of the liquid crystal layer LC is adjusted at $8.0 \times 10^{13}$ sec or less. For this reason, the liquid crystal display device DSP can suppress the flicker and exert stable performance by supplying the electric charges from the first alignment film AL1 to the liquid crystal layer LC.

Similarly, if the resistivity $\rho 1$ of the first alignment film AL1 is so large, the electric charges of the liquid crystal layer LC cannot be supplied for compensation since the electric charges are hardly exchanged between the first alignment film AL1 and the liquid crystal layer LC. In contrast, if the resistivity $\rho 2$ is so small, the liquid crystal display device DSP cannot exert stable performance since the liquid crystal panel PNL becomes electrically sensitive. In the embodiments, the resistivity of the first alignment film AL1 is adjusted at $1 \times 10^{11}$ $\Omega \cdot cm$ or more and $5.0 \times 10^{15}$ $\Omega \cdot cm$ or less. For this reason, the liquid crystal display device DSP can suppress the flicker and exert stable performance.

The embodiments are excellent in optical properties such as contrast since the liquid crystal layer LC contains the liquid crystal molecules having the negative dielectric anisotropy. Since the materials of the liquid crystal molecules having the negative dielectric anisotropy are less than those of the liquid crystal molecules having the positive dielectric anisotropy, the time constant (R2·C2) of the liquid crystal layer LC is approximately $8.0 \times 10^{13}$ sec or less. In the embodiments, the time constant (R1·C1) of the first alignment film AL1 is adjusted at $1.0 \times 10^{10}$ sec or more and $2.0 \times 10^{13}$ sec or less, and the time constant (R2·C2) of the liquid crystal layer LC can be set to be larger than the time constant (R1·C1) of the first alignment film AL1.

In general, scanning lines GL and the signal lines SL in the switching elements SW of LTPS-TFT can be made thinner than those in the switching elements of the oxide semiconductor TFT since the switching elements SW of LTPS-TFT are excellent in electron drift velocity as compared with the switching elements of the oxide semiconductor TFT. In the switching elements SW of LTPS-TFT, however, flicker may easily occur since the off-leak current is large.

In the embodiments, the pixel electrodes PE are connected to the switching elements SW of LTPS-TFT. The scanning lines GL and the signal lines SL can be made thinner by LTPS-TFT excellent in electron drift velocity and the liquid crystal panel PNL can be manufactured to have higher definition and designed in a narrower frame shape. Since the time constant (R2·C2) of the liquid crystal layer LC is larger than the time constant (R1·C1) of the first alignment film AL1, the flicker can be suppressed even if the off-leak current is large.

In the embodiments, dust hardly occurs in the manufacturing process since the first alignment film AL1 is an optical alignment film. The resistivity $\rho 1$ may be disturbed and the time constant (R1·C1) of the first alignment film AL1 may be varied due to impurities, but the time constant (R1·C1) can be adjusted with high accuracy in the embodiments.

The embodiments are constituted such that the time constant (R3·C3) of the second alignment film AL2 is larger than the time constant (R2·C2) of the liquid crystal layer LC and that the time constant (R2·C2) is larger than the time constant (R1·C1) of the first alignment film AL1. For this reason, even if the electric charges excessively flow from the first alignment film AL1 to the liquid crystal layer LC, the liquid crystal layer LC can be protected by urging the electric charges to escape from the liquid crystal layer LC to the second alignment film AL2.

In the embodiments, the second alignment film AL2 is a rubbing alignment film. In general, since the materials of the rubbing alignment film can be selected more widely than those of the optical alignment film, combination of the time constants can be adjusted such that the time constant (R3·C3) is larger than the time constant (R2·C2) and that the time constant (R2·C2) is larger than the time constant (R1·C1). Moreover, since the rubbing alignment film is excellent in the force of aligning the liquid crystal molecules, the liquid crystal layer LC is hardly influenced even if the pressure is applied from the touch panel or the like.

A desirable difference between the time constants of the liquid crystal layer LC and the first alignment film AL1 will be considered hereinafter while defining a permissible range of the brightness reduction of the liquid crystal panel PNL to be 1% or less. If the frequency of the control circuit CTR is, for example, 1 Hz, the voltage reduction of the liquid crystal layer LC in one frame is, for example, less than 0.5%.

In this case, 1/1 Hz is equal to 1 sec in one frame. In the embodiments, the brightness of the liquid crystal panel PNL is lowered by 1% if the voltage V2 of the liquid crystal layer LC is lowered by 0.25%. To suppress the voltage reduction of the liquid crystal layer LC to 0.25% or less, the voltage V2 needs to be raised by at least 0.25% in 1 sec. If the difference between the time constant (R2·C2) of the liquid crystal layer LC and the time constant (R1·C1) of the first alignment film AL1 is $4.0 \times 10^2$ sec (=1 sec÷0.25%), the electric charges which urge the voltage V2 to rise by 0.25% flow from the first alignment film AL1 to the liquid crystal layer LC. If the difference between the time constant (R2·C2) of the liquid crystal layer LC and the time constant (R1·C1) of the first alignment film AL1 is adjusted at $4.0 \times 10^3$ sec or less in consideration of the permissible amount, the reduction in brightness of the liquid crystal panel PNL can be suppressed to 1%.

In the liquid crystal display device DSP of the low-frequency drive scheme, the reduction in brightness of the liquid crystal panel PNL can be suppressed to 1% or less and the display quality can be improved by adjusting the difference (R2·R2−R1·R1) between the time constants of the liquid crystal layer LC and the first alignment film AL1 at $4.0 \times 10^3$ sec or less. If the frequency of the liquid crystal display device DSP is 20 Hz or less, the difference between the time constants may be adjusted at $4.0 \times 10^2$ sec or less since the flicker cannot be visually recognized as compared with a case where the frequency is 1 Hz.

It should be noted that change of design may be arbitrarily added to the present invention, based on the display device described as one of the embodiments. The accompanying claims and their equivalents are intended to cover display devices modified as would fall within the scope and spirit of the inventions.

What is claimed is:

1. A display device comprising:
a first substrate;
a second substrate opposed to the first substrate;
a liquid crystal layer between the first substrate and the second substrate;
a first alignment film on the first substrate to be in contact with the liquid crystal layer;
a second alignment film provided on the second substrate to be in contact with the liquid crystal layer;
a pixel electrode on the first substrate and covered with the first alignment film; and
a common electrode on the first substrate to form a lateral electric field between the pixel electrode and the common electrode,
wherein
the liquid crystal layer is driven at a frequency of 40 Hz or less,
the pixel electrode is connected to a transistor comprising a silicon semiconductor, and
a time constant of the liquid crystal layer is larger than a time constant of the first alignment film, and is smaller than a time constant of the second alignment film.

2. The display device of claim 1, wherein
the liquid crystal layer contains liquid crystal molecules having a negative dielectric anisotropy.

3. The display device of claim 1, wherein
the first alignment film is an optical alignment film.

4. The display device of claim 1, wherein
the time constant of the first alignment film is $1.0 \times 10^{10}$ sec or more and $2.0 \times 10^{13}$ sec or less and the time constant of the liquid crystal layer is $8.0 \times 10^{13}$ sec or less.

5. The display device of claim 1, wherein
a resistivity of the first alignment film is $1.0 \times 10^{11}$ Ω·cm or more and $5.0 \times 10^{15}$ Ω·cm or less.

6. The display device of claim 1, wherein
a difference between the time constant of the first alignment film and the time constant of the liquid crystal layer is $4.0 \times 10^3$ sec or less.

7. The display device of claim 1, wherein
the liquid crystal layer is driven at a frequency of 20 Hz or more, and
a difference between the time constant of the first alignment film and the time constant of the liquid crystal layer is $4.0 \times 10^2$ sec or less.

8. The display device of claim 1, wherein
the first alignment film is an optical alignment film and the second alignment film is a rubbing alignment film.

9. The display device of claim 4, wherein
a resistivity of the first alignment film is $1.0 \times 10^{11}$ Ω·m or more and $5.0 \times 10^{15}$ Ω·cm or less.

10. The display device of claim 4, wherein
a difference between the time constant of the first alignment film and the time constant of the liquid crystal layer is $4.0 \times 10^3$ sec or less.

11. The display device of claim 5, wherein
a difference between the time constant of the first alignment film and the time constant of the liquid crystal layer is $4.0 \times 10^3$ sec or less.

12. The display device of claim 1, wherein the liquid crystal layer is driven at a frequency of 30 Hz or more.

* * * * *